US006550020B1

(12) United States Patent
Floyd et al.

(10) Patent No.: US 6,550,020 B1
(45) Date of Patent: Apr. 15, 2003

(54) METHOD AND SYSTEM FOR DYNAMICALLY CONFIGURING A CENTRAL PROCESSING UNIT WITH MULTIPLE PROCESSING CORES

(75) Inventors: Michael Stephen Floyd, Leander, TX (US); Kevin F. Reick, Austin, TX (US); Timothy M. Skergan, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/483,260

(22) Filed: Jan. 10, 2000

(51) Int. Cl.$^7$ .................................. G06F 11/00
(52) U.S. Cl. ............................. 714/10; 714/11
(58) Field of Search .................. 714/10, 11, 25, 714/37, 13, 9; 709/105, 107, 108, 201, 212; 710/7, 8, 10, 20

(56) References Cited

U.S. PATENT DOCUMENTS

| 4,823,256 A | * | 4/1989 | Bishop et al. ............... 700/82 |
| 5,544,174 A | * | 8/1996 | Abend ........................ 714/32 |
| 5,875,294 A | * | 2/1999 | Roth et al. .................. 710/18 |
| 5,931,931 A | | 8/1999 | Nguyen ...................... 710/113 |
| 6,134,675 A | * | 10/2000 | Raina |
| 6,378,027 B1 | * | 4/2002 | Bealkowski et al. ......... 709/223 |

FOREIGN PATENT DOCUMENTS

EP          982595 A1  *  3/2000  ....... G01R/31/3185

OTHER PUBLICATIONS

Geisinger, Patrick P. Microprocessor for the New Millennium: Challenges, Opportunities, and New Frontiers. 2001, IEEE Internation Solid State Circuits Conference. pp. 21–25.*

* cited by examiner

Primary Examiner—Nadeem Iqbal
Assistant Examiner—Timothy M. Bonura
(74) Attorney, Agent, or Firm—Casimer K. Salys; Bracewell & Patterson, L.L.P.

(57) ABSTRACT

A data processing system has at least one integrated circuit containing a central processing unit (CPU) that includes at least first and second processing cores. The integrated circuit also includes input facilities that receive control input specifying which of the processing cores is to be utilized. In addition, the integrated circuit includes configuration logic that decodes the control input and, in response, selectively controls reception of input signals and transmission of output signals of one or more of the processing cores in accordance with the control input. In an illustrative embodiment, the configuration logic is partial-good logic that configures the integrated circuit to utilize the second processing core, in lieu of a defective or inactive first processing core, as a virtual first processing core.

27 Claims, 6 Drawing Sheets

METHOD AND SYSTEM FOR DYNAMICALLY CONFIGURING A CENTRAL PROCESSING UNIT WITH MULTIPLE PROCESSING CORES

BACKGROUND OF THE INVENTION

1. Technical Field

The present invention relates in general to data processing systems and, in particular, to data processing systems having two or more processing cores. Specifically, the present invention relates to a method and system for dynamically configuring a central processing unit with multiple processing cores.

2. Description of the Related Art

Currently, microcomputers are widely utilized in homes and offices as, among other things, word processing devices and Web browsers. Such data processing systems generally utilize a single central processing unit (CPU) embodied in a single microprocessor chip. By contrast, microcomputers designed for more demanding tasks (e.g., network servers) commonly include multiple CPUs. While increasing the number of available processors augments computing power, coordinating the actions of the cooperating CPUs requires a concomitant increase in the complexity of the overall system architecture. For instance, in addition to the central processing units, multi-processor systems typically also include a service processor, the primary duty of which is to prepare the system for operation when the system is powered up or reset (i.e., booted). The service processor typically performs that duty, under the direction of a startup routine, by testing system components, collecting information regarding the system's hardware configuration, and then passing control to one of the CPUs for initiation of the operating system and completion of the boot procedure.

Due to recent advances in the manufacture of integrated circuits, however, multi-core microprocessor chips may soon be replacing single-core CPUs as the processor of choice for high-performance microcomputers. Multi-core microprocessors feature a single integrated circuit that includes two or more main processing cores, each of which may be utilized as if it was a separate central processing unit. Furthermore, in state-of-the-art multi-core processors, each of the main cores provides computing power that equals or exceeds that of a conventional high-performance single core processor.

Among the benefits provided by multi-core processors is an increase in physical processing core hdensity within multiprocessor data processing systems, in that more processing cores may operate within a given amount of space, which leads to improvements in overall multiprocessor system performance. A problem associated with multi-core CPUs, however, is that they require additional complexity be introduced into the areas of production testing, boot testing, and system operation. Also, multi-core processors are physically larger and more complex than single-core processors and are therefore more likely to suffer from production defects. However, conventional multi-core data processing systems lack effective means for addressing these problems.

Therefore, as recognized by the present invention, a need exists for methods and systems that reduce the complications associated with testing and utilizing multi-core CPUs. As the present invention also recognizes, there exists a need to provide flexibility with regard to configuring multi-core processors. For example, production yields could be increased if a multi-core CPU with a production defect in a first core (but not a second) could be configured so that the second core operates as if it is the first. Also, it would be beneficial to allow processing power to be augmented and malfunctioning processing cores to be replaced and/or eliminated without shutting down a system or otherwise interrupting system operation. It would also be advantageous to allow engineering code, testing code, and startup routines to be written without regard to many of the numerous details associated with utilizing one processing core to emulate another, and to allows such programs. Furthermore, it would be beneficial if engineering code, testing code, and startup routines that were designed for single-core multiprocessor machines or for fully populated multi-core multiprocessor machines could be utilized, with little or no modification, in systems with partially good or partially inactive multi-core processors. As described below, the present invention provides these and other benefits.

SUMMARY OF THE INVENTION

A data processing system according to the present invention has at least one integrated circuit containing a central processing unit (CPU) that includes at least first and second processing cores. The integrated circuit also includes input facilities that receive control input specifying which of the processing cores is to be utilized. In addition, the integrated circuit includes configuration logic that decodes the control input and, in response, selectively controls reception of input signals and transmission of output signals of one or more of the processing cores in accordance with the control input. In an illustrative embodiment, the configuration logic is partial-good logic that configures the integrated circuit to utilize the second processing core, in lieu of a defective or inactive first processing core, as a virtual first processing core.

All objects, features, and -advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
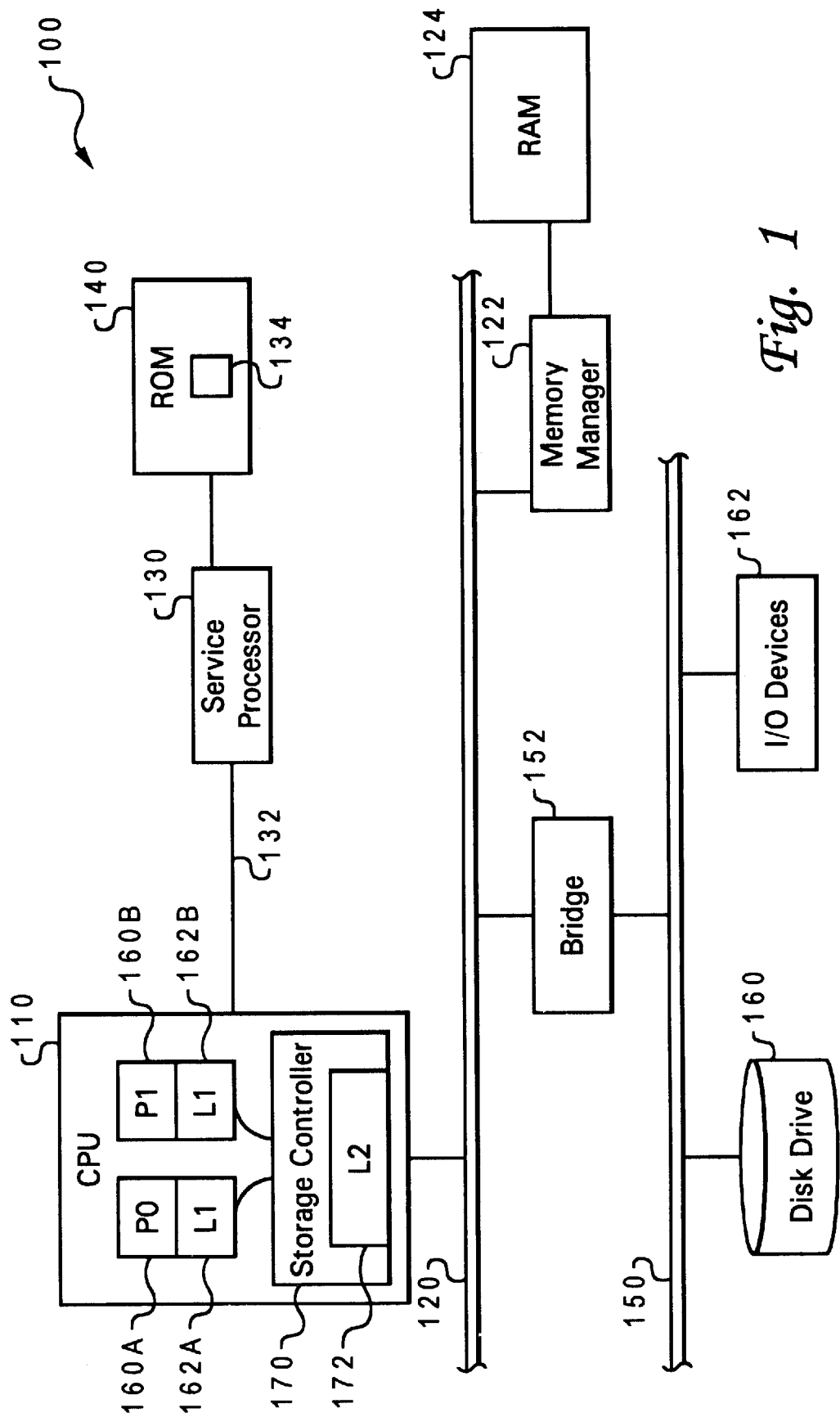
FIG. 1 illustrates a block diagram of an exemplary data processing system with facilities, in accordance with the present invention, for dynamically configuring a central processing unit (CPU) that has multiple processing cores.

With reference now to the figures, and in particular with reference to FIG. 1, there is depicted an illustrative data processing system 100 with facilities in accordance with the present invention for dynamically configuring multi-core central processing units (CPUs). As shown, data processing system 100 includes a CPU 110 that is connected, via a system bus 120 and a memory manager 122, to random access memory (RAM) 124. Also included in data processing system 100 are one or more local buses 150 which communicate with system bus 120 via one or more intermediate bus bridges 152. One or more permanent data storage devices, such as a disk drive 160, are attached to attached to local bus 150, as are input/output (I/O) devices 162, such as a keyboard, a mouse, a display device, a communication port, and/or other I/O equipment (not illustrated).

According to the present invention, CPU 110 is a single integrated circuit that contains at least two processing cores 160A and 160B and corresponding L1 caches 162A and 162B. For purposes of this document, a core (i.e., a processing core) includes instruction fetching facilities (such as in instruction fetch unit), instruction execution facilities (such as at least one of a fixed-point arithmetic logic unit and a floating-point arithmetic logic unit) and facilities (such as a load/store unit) for retrieving data from and storing data to components outside of the core. In the illustrative embodiment, the processing cores are designated as Core0 160A and Core1 160B, and each is connected to a storage controller 170 that also resides in CPU 110. Storage controller 170 contains an L2 cache 172 and provides Core0 160A and Core1 160B with an interface to global data storage, such as RAM 124.

Data processing system 100 also includes a service processor 130 that is connected to CPU 110 via a configuration bus 132, such as a Joint Test Access Group (JTAG) interface complying with IEEE standard 1149.1. Optionally, data processing system 100 may include additional CPUs, each of which would be connected, like CPU 110, both to system bus 120 and to service processor 130.

When data processing system 100 is powered up, service processor 130 automatically prepares the system for operation by executing startup instructions that are stored as a boot program 134 in a read-only memory (ROM) 140 of data processing system 100. In particular, boot program 134 causes service processor 130 to perform initial system testing and configuration functions. For example, as described in greater detail below, the service processor performs a processor validation routine that determines whether all of the processing cores are operational and generates a processor identifier (PID) table that includes a distinct PID for each of the working cores. The PID table is utilized during operation of the system by the operating system and/or the application programs to allocate duties among the cores.

Figure 2:
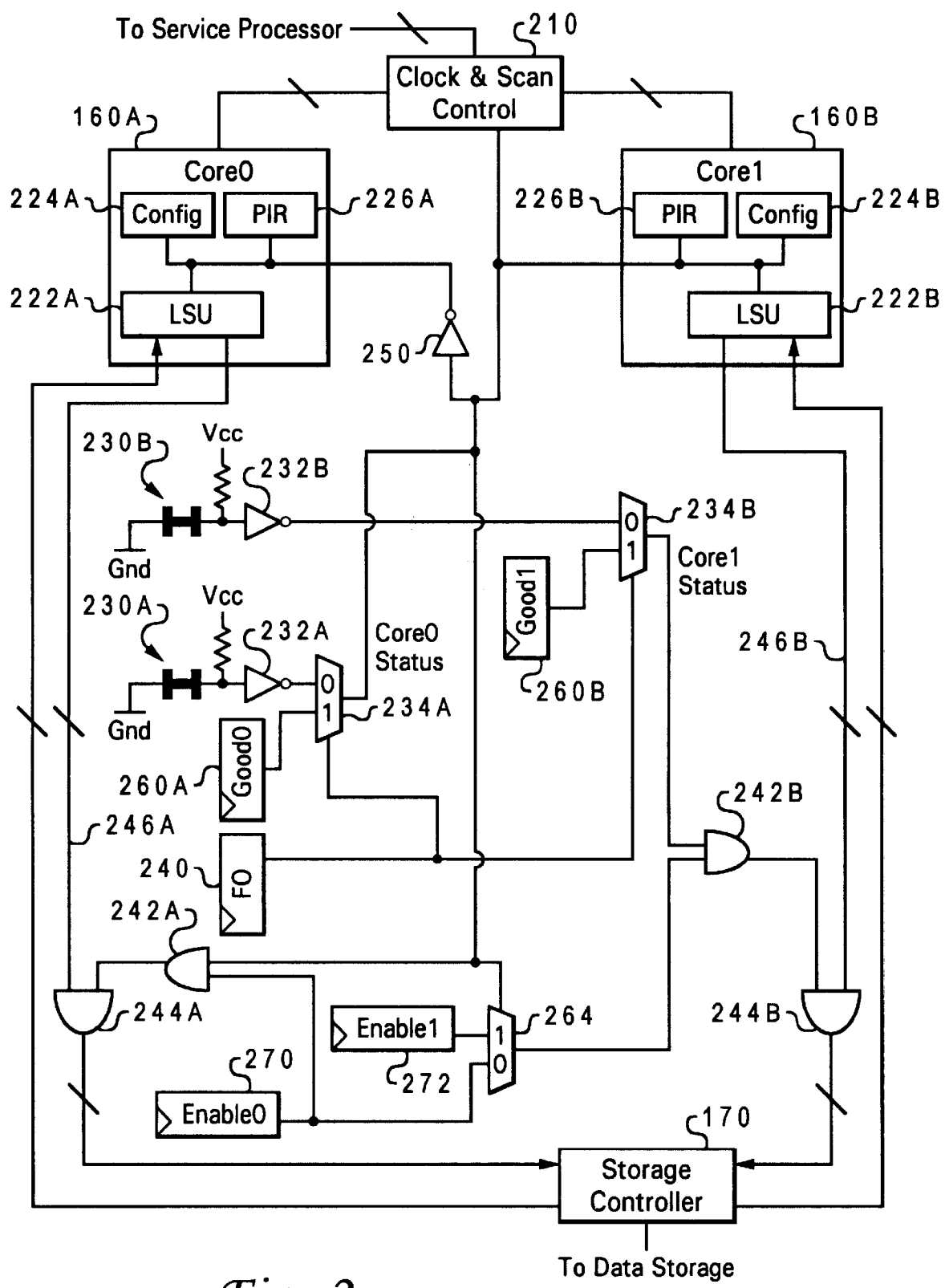
FIG. 2 depicts a more detailed block diagram of the CPU of the data processing system of FIG. 1.
Figure 3:
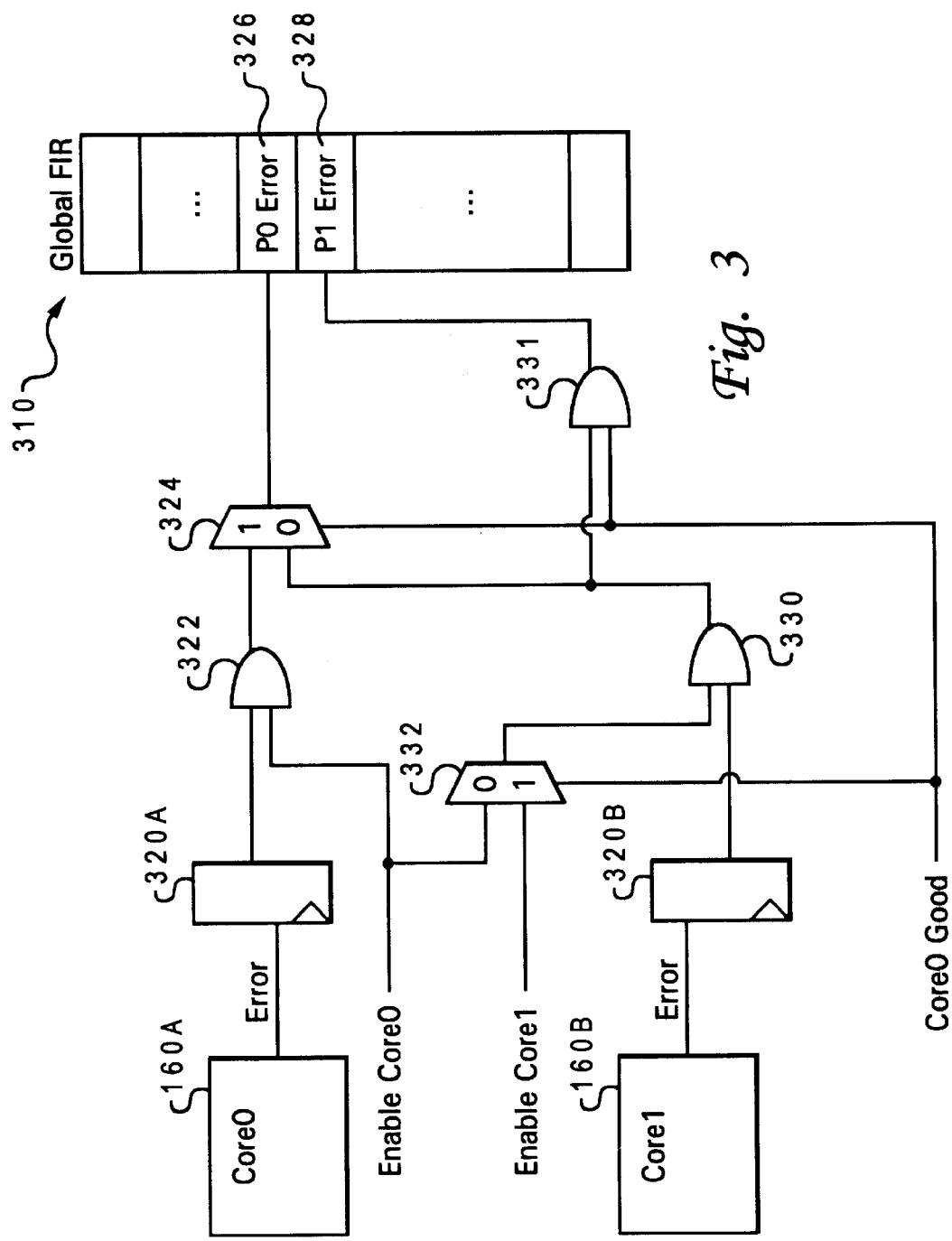
FIG. 3 illustrates a block diagram of facilities within the CPU of FIG. 2 for directing an exemplary type of output to an appropriate destination in accordance with the present invention.

Referring now to FIG. 2, there is depicted a more detailed block diagram of CPU 110. As shown, service processor 130 communicates with Core0 160A and Core1 160B through clock and scan control logic 210, and Core0 160A and Core1 160B communicate with global data storage through storage controller 170. Scan control logic 210 includes register interface logic that allows service processor 130 to manipulate global registers, such as a global fault isolation register 310 (illustrated in FIG. 3). In the illustrative embodiment, clock and scan control logic 210 and storage controller 170 are contained in CPU 110 along with Core0 160A and Core1 160B.

Each one of Core0 160A and Core1 160B includes a full set of the components utilized by conventional single-core CPUs to fetch, decode, and execute instructions and transfer information to and from other parts of data processing system 100. For example, Core0 160A and Core1 160B include, respectively, load/store units (LSUs) 222A and 222B, configuration/status registers 224A and 224B, processor identification registers (PIRs) 226A and 226B. Within each of LSUs 222A and 222B, configuration/status registers 224A and 224B, and PIRs 226A and 226B is a processor identification (PID) field that is used to match instructions and data that are carried into CPU 110 to a particular core. These PID fields correspond to the PIDs in the PID table that is generated when the system is booted.

Figure 4:
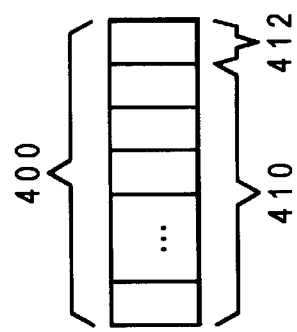
FIG. 4 depicts the structure of an illustrative processor identification field within an exemplary load/store unit of the CPU of FIG. 2.

As illustrated in FIG. 4 (which depicts the structure of an exemplary PID field for LSUs 222A and 222B), each PID field 400 contains a CPU (or chip) identification field 410, as well as a core identification field 412. In the illustrative embodiment, six bits are utilized as a CPU identifier, and one bit is utilized as a core identifier, thereby supporting up to sixty-four dual-core processors. However, as will be apparent to those with ordinary skill in the art, additional bits could be utilized for the core identifier to support CPUs with more than two processing cores, and additional bits could be utilized for the CPU identifier to more than sixty-four CPUs. In any case, when data for Core0 160A and Core1 160B are transmitted within data processing system 100, data tags identifying the destination core (by PID) are transmitted with the data. Core0 160A and Core1 160B compare their PID fields with the data tags to determine which data should be accepted for processing.

In conventional systems with single-core CPUs, boot programs may simply omit defective cores from the PID table. However, if a multi-core CPU is found to have a bad core, preparing the system to operate without the bad core may be more difficult. For example, if a system includes first and second CPUs that each have a core0 and a core1, and core0 of the first CPU is bad, a startup routine utilizing conventional methodology might simply build a PID table that lists PID1, PID2, and PID3, with those PIDs being associated with core1 of the first CPU and core0 and core1 of the second CPU, respectively. However, service processor and operating system routines for testing, maintaining, and utilizing the cores, are often designed to interact (either exclusively or by default) with core0 (or PID0). For example, boot programs typically cause the service processor to pass control to PID0 as part of the boot process. Furthermore, facilities for engineering and production testing multi-core CPUs present similar constraints, and additional difficulties may be presented by other system components, including hardware constraints (such as external interrupts that are hardwired for PID0 and multi-core CPUs that have only one JTAG interface). Consequently, when preparing a data processing system for operation, the service processor ordinarily should not simply omit the PID corresponding to a defective core0, unless, of course, additional functionality has been added to the various components involved to enable them to determine that the default core is bad and redirect communications accordingly.

The present invention provides partial-good logic which resides in CPU 110 and makes it possible to overcome such constraints with little or no modification to the components (such as startup programs and testing facilities) that interact with CPU 110. In particular, among the CPU configurations supported by the partial-good logic of the present invention are a first configuration that allows data processing system 100 to utilize only Core0 160A, a second configuration which allows only Core1 160B to be utilized, and a third configuration in which data processing system 100 operates as a dual-processor system, utilizing both Core0 160A and Core1 160B. As described in greater detail below, in the first and second configurations the partial-good logic prevents output from the dormant core from reaching storage controller 170. Further, in the second configuration, the partial-good logic interacts with components and operations of CPU 110 (such as, without limitation, clock controls, scan control logic, external interrupts, configuration and status registers, and processor identifications fields) to cause Core1 160B to emulate Core0 160A. For example, as described in greater detail below, the partial-good logic clears the core identification bits of Core1 160B, thereby causing Core1 160B to processing instructions and data addressed to Core0 160A. Consequently, system components (such as service processor code and engineering code, for example) are able to interact with a virtual core0, even though Core0 160A may have been deactivated. Furthermore, as also explained below, the partial-good logic may be configured dynamically (i.e., during the boot process and/or at run time).

As an example of how the partial-good logic can cause Core1 160B to emulate Core0 160A (thereby serving as a virtual core0), it may be known that the address x'021250' denotes a Core0 resource (such as a data cache fault register), whereas the address x'121250' denotes a matching Core1 resource, with the first digit of each address serving as the core identifier. If service processor 130 requests the contents of the address x'021250' and the core identification bits of Core0 160A are set to 0 (i.e., cleared), Core0 160A will return the requested data to service processor 130. However, if Core0 160A is dormant and the core identification bits of Core1 160B are set to 0, Core1 160B will return the requested data, even though the request was addressed to Core0 160A. Input from other components, and operations of data processing system 100 (such as input from external interrupts, clocking controls, scan ring definitions, engineering code, and initial program load code) are likewise directed to appropriate destinations by the partial-good logic.

Default Hardware Configuration

A default configuration for the partial-good logic may be specified by the hardware of CPU 110, and that configuration may be altered by service processor 130 dynamically, for example according to instructions in boot program 134 or in response to error conditions detected at run time. The components of the partial-good logic that determine the default hardware configuration include a Bad-Core0 fuse 230A and Bad-Core1 fuse 230B. If it is determined in the production process that Core0 160A or Core1 160B is defective, the corresponding Bad-Core0 fuse 230A or Bad-Core1 fuse 230B may be blown to implement, as a default configuration, the first or second configuration described above. Otherwise, Bad-Core0 fuse 230A and Bad-Core1 fuse 230B are left intact to select the third configuration as the default configuration. The partial-good logic also includes a Fuse-Override latch 240, which may be set high by service processor 130 to override the default configuration.

The three following examples demonstrate how portions of the partial-good logic of the illustrative embodiment operate when Fuse-Override latch 240 is set low. If Bad-Core1 fuse 230B is blown and Bad-Core0 fuse 230A is not, the first configuration is indicated. Accordingly, a low signal is sent from an inverter 232B to a multiplexer 234B. The low signal is then forwarded via an AND gate 242B to an AND gate (or gates) 244B to block (or fence) the signals on an LSU output bus 246B for Core1 160B. In addition, a high signal is sent from an inverter 232A, through a multiplexer 234A, and into an inverter 250. Consequently, inverter 250 transmits a low signal into LSU 222A, configuration/status register 224A, and PIR 226A to set the core identification bits of Core0 160A to 0.

Alternatively, if Bad-Core0 fuse 230A is blown and Bad-Core1 fuse 230B is not, the second configuration is indicated. Accordingly, a low signal is sent from inverter 232A, through multiplexer 234A and an AND gate 242A, to an AND gate (or gates) 244A to block (or fence) the signals on an LSU output bus 246A for Core0 160A. In addition, the low signal from multiplexer 234A is carried into LSU 222B, configuration/status register 224B, and PIR 226B of Core 1 160B. That signal causes the core identification bit in the PID field within each of those components to be cleared, thereby causing Core1 160B to emulate Core0 160A, as described above.

However, when neither bad core fuse is blown, the third (dual-processor) configuration is indicated. Accordingly, high signals are sent from inverters 232A and 232A to AND gates 244A and 244B, as described above, thereby allowing both Core0 160A and Core1 160B to transmit data to storage controller 170. The high signal from inverter 232A also causes the core identifier bits of Core1 160B to be set and, after being flipped by inverter 250, causes the core identification bits of Core0 160A to be cleared.

Dynamic Reconfiguration

To dynamically implement a configuration other than the default configuration, however, service processor 130 sets Fuse-Override latch 240 high and sets or clears a Good0 latch 260A and a Good1 latch 260B of the partial-good logic. For example, service processor 130 may utilize the processes described below to test and configure data processing system 100 at boot time and/or to alter the configuration at run time (e.g., by deactivating Core0 160A and activating Core1 160B in response to a malfunction of Core0 160A).

Figure 5A:
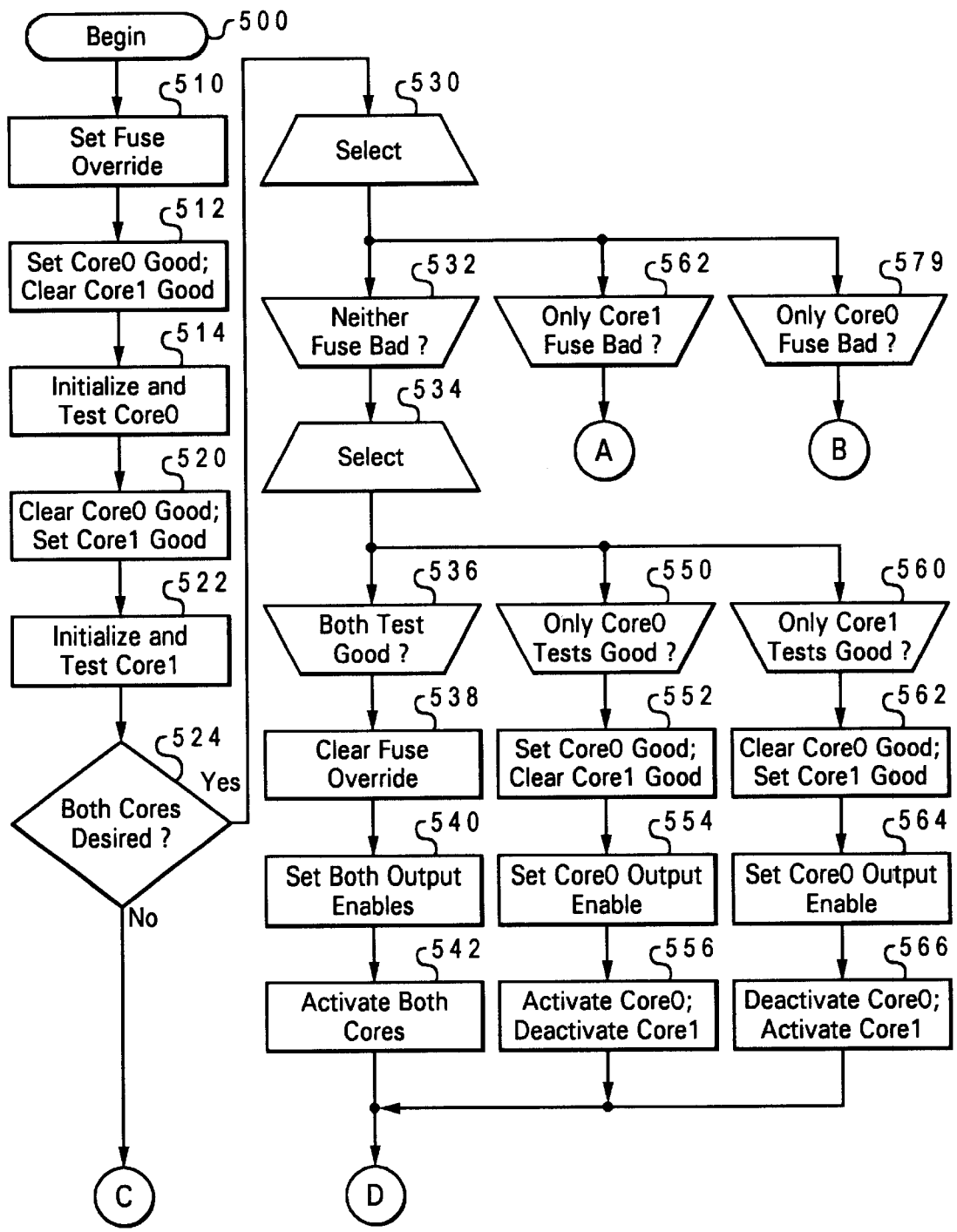
FIGS. 5A–5C depict a logical flowchart of an illustrative method within a boot process for configuring the CPU of FIG. 2 to utilize one processing core to emulate another in accordance with the present invention.
Figure 5B:
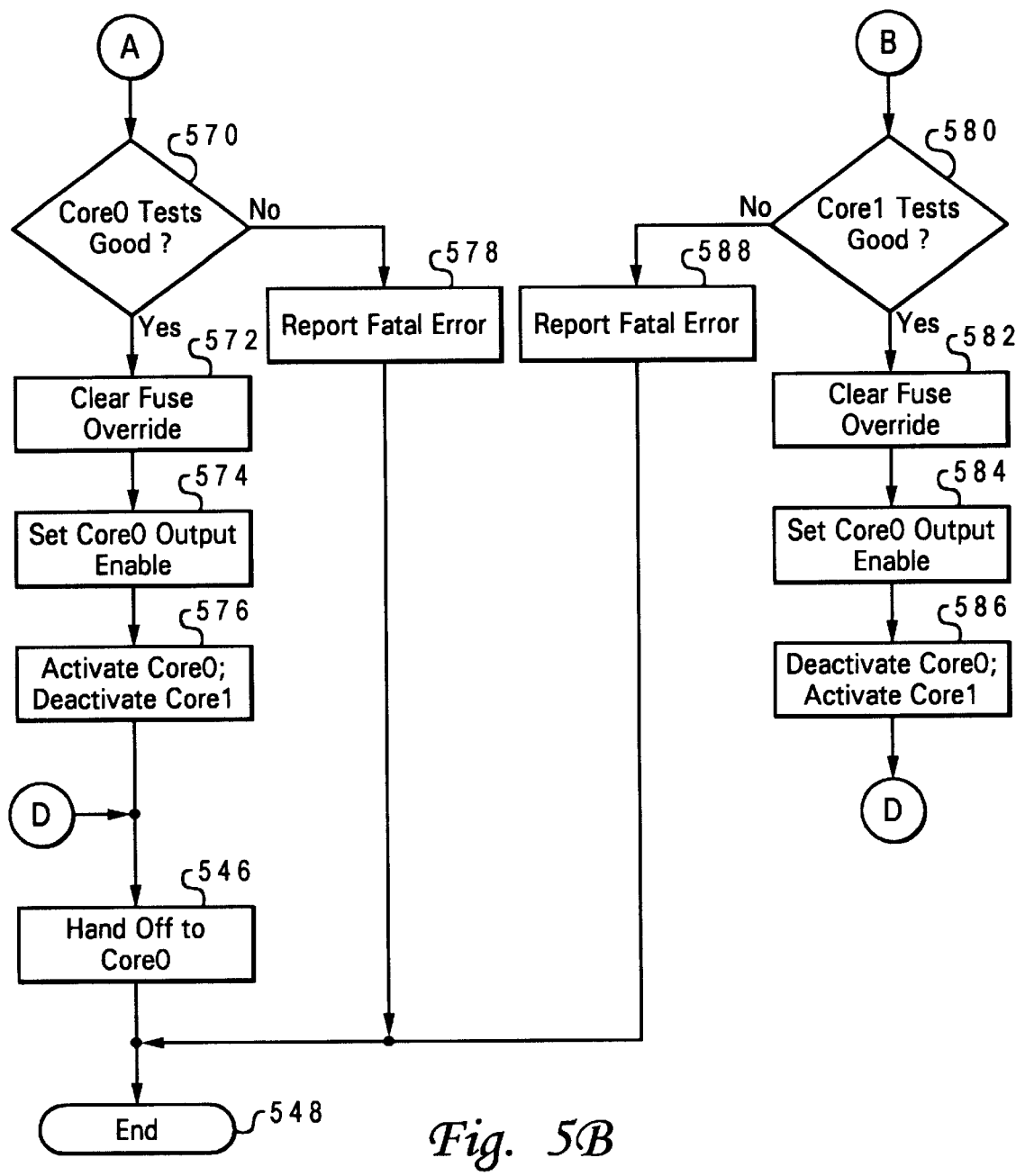
Figure 5C:
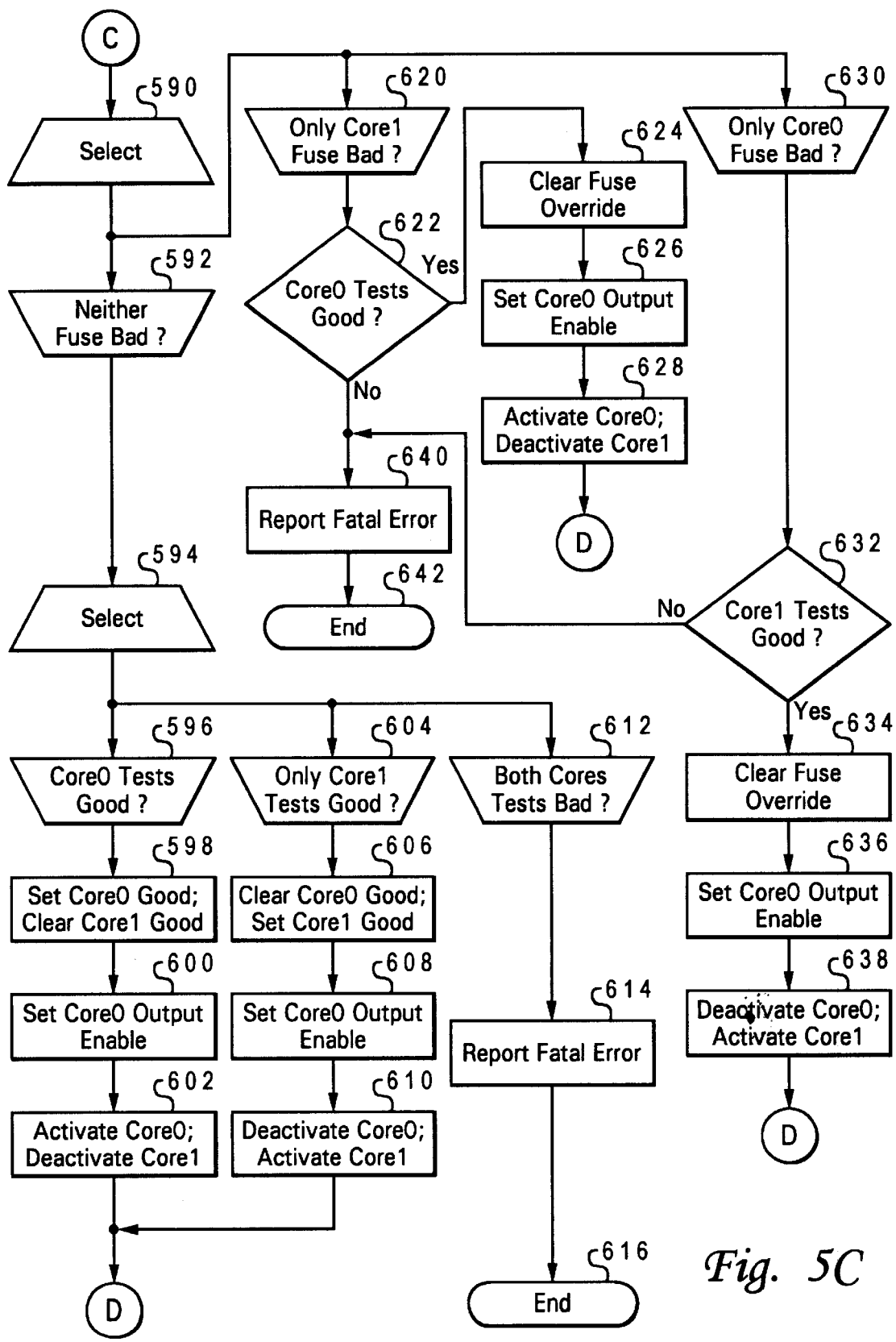

With reference now to FIGS. 5A–5C, there is depicted a logical flowchart of an illustrative method within a boot process for dynamically configuring CPU 110 in accordance with the present invention, including steps for configuring CPU 110 to utilize one processing core to emulate another. The process begins at block 500 with service processor 130 initiating boot program 134, for example upon detecting that data processing system 100 is being powered up. The process then passes to block 510, which shows service processor 130 setting Fuse Override latch 240. Then, as illustrated at block 512, service processor 130 sets Good0 latch 260A and clears Good1 latch 260B, thereby invoking the first configuration in which Core0 160A serves as the virtual core0. As depicted at block 514, service processor 130 then initializes Core0 160A to a clean state and then tests Core0 160A, for example by causing a built-in self test (BIST) to execute and/or by utilizing a JTAG interface to test Core0 160A scan chains.

The process then passes to block 520, which shows service processor 130 clearing Good0 latch 260A and setting Good1 latch 260B, thereby invoking the second configuration. Service processor 130 then initializes and tests Core1 160B as it did Core0 160A. In fact, since the current partial-good logic configuration causes Core1 160B to emulate Core0 160A, the testing program utilized by service processor 130 need not be complicated with logic for directing test data to and receiving results from multiple cores. Instead, service processor 130 may simply utilize testing code designed for a CPU containing only one core (i.e., a CPU with only a Core0). The partial-good logic automatically redirects the input and output to the core that is serving as the virtual core0.

After both Core0 160A and Core1 160B have been tested, the process passes to block 524, which depicts service processor 130 determining whether both cores are desired. For example, a data processing system vendor might offer both single-core and dual-core systems but actually deliver only dual-core systems, with one core begin deactivated if the customer has only paid for a single-core system. Further, the vendor may utilize the system's ROM to store instructions that specify how many cores should be active at any one time. The present invention supports such an arrangement, thereby allowing the vendor to utilize more uniform production processes and, importantly, to reduce or eliminating the amount of down-time suffered when a core goes bad, as described below.

Both Cores Desired; Both Fuses Intact; Cores Test Good

If both cores are desired, the service processor 130 then enters a select construct, as shown at block 530, wherein a determination is made as to whether either Bad-Core0 fuse 230A or Bad-Core1 fuse 230B is blown, as shown at block 532. If both fuses are intact, the process enters another select construct, as depicted at block 534. Service processor 130 then determines whether the results of the earlier tests indicate that Core0 160A and Core1 160B are both good, as illustrated at block 536. If so, the process passes to block 538, which depicts service processor 130 clearing Fuse Override latch 240, thereby causing multiplexers 234A and 234B to pass the high signals from inverters 232A and 232B, respectively.

As shown at block 540, service processor 130 then sets Output Enable latches 270 and 272 (which are illustrated in FIG. 2). Output Enable latches 270 and 272 serve as additional means for controlling output from Core0 160A and Core1 160B. Unlike Good0 and Good1 latches 260A and 260B, however, Output Enable latches 270 and 272 allow the output to be fenced by reference to a virtual core, rather than a physical core. For example, Output. Enable latch 270 controls output from virtual core0, whether virtual core0 is actually provided by Core0 160A or by Core1 160B in emulation of Core0 160A. Likewise, Output Enable latch 272 controls output from virtual core0

For example, referring again to FIG. 2, if both Core0 160A and Core1 160B are active and Output Enable latches 270 and 272 are both set, AND gate 242A will receive high signals from multiplexer 234A and from Output Enable latch 270. Consequently, AND gate 244A to will allow signals from Core0 160A to pass. Also, the high signal from multiplexer 234A will cause a multiplexer 264 to forward the high signal from Output Enable latch 272 to AND gate 242B, which will also be receiving a high signal from multiplexer 234B. AND gate 244B will therefore allow signals to pass from Core1 160B, as well.

Alternatively, if Core0 160A has been deactivated and Core1 160B is serving as a virtual Core0, multiplexer 264 will receive a low select signal from multiplexer 234A, which will cause multiplexer 264 to pass the virtual Core0 enable signal from Output Enable latch 270 to AND gate 242B. Furthermore, the low signal from multiplexer 234A will pass through AND gate 242A to AND gate 244A, thereby fencing the output from Core0 160A.

With reference again to FIGS. 5A–5C, after Output Enable latches 270 and 272 are set, the process passes to block 542, which shows service processor 130 activating Core0 160A and Core1 160B, for example by forwarding the signals from multiplexers 234A and 234B into respective AND gates (not illustrated) in respective paths from the system clock (not illustrated) to Core0 160A and Core1 160B. The process then proceeds through page connector D to block 546, which shows service processor 130 handing control over to virtual core0 (e.g., by loading the address of the next boot instruction to be processed into an instruction pointer of virtual core0). As far as service processor 130 is concerned, the process of booting data processing system 100 then ends, as shown at block 548.

Both Cores Desired; Both Fuses Intact; Core Tests Bad

Now referring back to block 534, if it is determined that Core0 160A and Core1 160B are not both good, but that only Core0 160A is good, the process passes through block 550 to block 552, which depicts service processor 130 setting Good0 latch 260A and clearing Good1 latch 260B (and leaving Fuse Override latch 240 set high). Consequently, multiplexers 234A and 234B transmit high and low signals, respectively, which causes Core0 160A to serve as virtual core0 and fences the output from Core1 160B, as described above. Then, as depicted at block 554, service processor 130 sets Output Enable latch 270 high and, as shown at block 556, activates Core0 160A and deactivates Core1 160B. The process then passes through page connector D to block 546, which shows service processor 130 handing control to virtual core0, as described above. The process then ends, as depicted at block 548.

Referring to block 534 again, if it is instead determined that only Core1 160B is good, the process passes through block 560 to block 562, which shown service processor 130 clearing Good0 latch 260A and setting Good1 latch 260B. As a result, multiplexers 234A and 234B transmit low and high signals, respectively, which causes Core1 160B to serve as virtual core0 and fences the output from Core0 160A, as described above with reference to FIG. 2. As illustrated at blocks 564 and 566, service processor 130 then sets Output Enable latch 270 high and deactivates Core0 160A and activates Core1 160B. The process then proceeds through page connector D to block 546, which shows service processor 130 passing control to virtual coreo. Then the process ends, as shown at block 548.

Both Cores Desired; One Fuse Blown

Referring again to block 530, if, however, service processor 130 determines that Bad-Core0 fuse 230A is still intact but Bad-Core1 fuse 230B has been blown, the process passes through block 562 and page connector A to block 570. As shown at block 570, service processor 130 then determines whether the earlier tests indicate that Core0 160A is good. If so, service processor 130 clears Fuse Override latch 240, as illustrated at block 572, which causes multiplexer 234A to pass the high signal from inverter 232A and causes multiplexer 234B to pass the low signal from inverter 232B, which causes Core0 160A to operate as virtual core0 and causes AND gate 244B to fence the output from Core1 160B, as explained above. Service processor 130 then sets Output Enable latch 270, as shown at block 574, and activates Core0 160A and deactivates Core1 160B, as shown at block 576. Then, as illustrated at blocks 546 and 548, respectively, service processor 130 passes control to virtual cored and the process ends. However, referring again to block 570, if it is determined that Core0 160A tested bad, service processor 130 simply reports a fatal error and the process then ends, as depicted at blocks 578 and 548, respectively.

With reference again to block 530 of FIG. 5A, if it is determined that only Bad-Core0 fuse 232A has been blown, the process passes through block 579 and page connector B to block 580, which illustrates service processor 130 determining whether the earlier tests indicate that Core1 160B is functioning correctly. If so, service processor 130 clears Fuse Override latch 240, sets Output Enable latch 270, and deactivates Core0 160A while activating Core1 160B, as depicted at blocks 582, 584, and 586, respectively, thereby configuring data processing system 100 to utilize Core1 160B as a virtual core0, as described above. The process then passes through connector D to block 546, which shows service processor 130 passing control to virtual core0, and the process then ends, as shown at block 548. However, referring again to block 580, if it is determined that Core1 160B tested bad, service processor 130 simply reports a fatal error and the process then ends, as depicted at blocks 588 and 548, respectively.

One Core Desired; Both Fuses Intact

If it was determined at block 524 of FIG. 5A that both Core0 160A and Core1 160B are not desired, the process passes through page connector C to block 590 of FIG. 5C. As shown at block 592, service processor 130 then determines whether Bad-Core0 fuse 230A and Bad-Core1 fuse 230B are both still intact. If so, the process passes to another select construct, as illustrated at block 594. It is then determined whether Core0 160A tested good. If so, the process passes through block 596 to block 598, which depicts service processor 130 setting Good0 latch 260A and clearing Good1 latch 260B, thereby setting up Core0 160A as a virtual core0 and fencing the output from Core1 160B. Service processor 130 then sets Output Enable latch 270, as shown at block 600, and activates Core0 160A and deactivates Core1 160B, as depicted at block 602. The process then proceeds through page connector D to block 546 in FIG. 5B. As shown at block 546, service processor 130 then transfers control to virtual core0, and the process ends, as illustrated at block 548.

With reference again to block 594, if, instead, it is determined that only Core1 160B tested good, the process passes through block 604 to blocks 606, 608, and 610. Those blocks show service processor 130 configuring data processing system 100 to utilize Core1 160B as a virtual core0 by clearing Good0 latch 260A, setting Good1 latch 260B, setting Output Enable latch 270, deactivating Core0 160A, and activating Core1 160B. The process then passes through page connector D to blocks 546 and 548, which respectively depict service processor 130 passing control to virtual core0 and the process terminating.

Referring again to block 594, if it is determined that both Core0 160A and Core1 160B tested bad, the process passes through block 612 to block 614, which shows service processor 130 reporting a fatal error. The process then ends, as illustrated at block 616.

One Core Desired; One Fuse Blown

However, if it is determined at block 590 that Bad-Core1 fuse 230B is blown, the process passes through block 620 to block 622, which shows service processor 130 determining whether Core0 160A tested good. If so, as shown in block 624, service processor 130 clears Fuse Override latch 240, thereby causing multiplexer 234A to pass the high signal from inverter 232A and multiplexer 234B to pass the low signal from inverter 232B, which causes Core0 160A to operate as virtual coreo and causes the output from Core1 160B to be fenced, as described above. Then, as illustrated at blocks 626 and 628, service processor 130 sets Output Enable latch 270, activates Core0 160A, and deactivates Core1 160B. The process then proceeds through page connector D to block 546, which shows service processor 130 passing control to virtual core0. Then, as depicted at block 548, the process ends. However, if it is determined at block 622 that Core0 160A tested bad, service processor 130 reports a fatal error and the process ends, as shown at blocks 640 and 642, respectively.

If, on the other hand, service processor 130 determines at block 590 that Bad-Core0 fuse 230A is blown, the process passes through block 630 to block 632, which shows service processor 130 determining whether Core1 160B tested good. If so, as illustrated at block 634, service processor 130 clears Fuse Override latch 240, thereby causing multiplexer 234A to pass the low signal from inverter 232A and multiplexer 234B to pass the high signal from inverter 232B, which causes Core1 160B to operate as virtual core0 and causes the output from Core0 160A to be fenced. Then, as illustrated at blocks 636 and 638, service processor 130 sets Output Enable latch 270, deactivates Core0 160A, and activates Core1 160B. The process then passes through page connector D to block 546, which shows service processor 130 passing control to virtual core0. Then, as depicted at block 548, the process ends. If, however, it is determined at block 632 that Core1 160B tested bad, a fatal error is reported and the process ends, as shown at blocks 640 and 642, respectively.

Thus, the partial-good logic of the present invention allows for customized static and dynamic configuration of multi-core processors such as CPU 110. In particular, the present invention allows fuses and boot code to be used to control the particular configuration to be utilized, redirecting input as necessary to allow one core to emulate another and blocking output from any dormant core.

Additional Partial-Good Output Logic

In addition, the partial-good logic includes circuitry that serves to redirect output coming from parts of Core0 160A and Core1 160B other than LSUs 222A and 222B (such as configuration registers 244A and 244B and PIRs 226A and 226B). For example, with reference again to FIG. 3, there is illustrated exemplary partial-good logic for routing output to a global fault isolation register (FIR) 310. The partial good logic includes latches 320A and 320B in communication with-error signal generators-in Core0 160A and Core1 160B, respectively. When Output Enable latch 270 if FIG. 2 is set high (indicating that virtual core0 is enabled), and Core0 160A transits an error signal to latch 320A, that error signal passes through an AND gate 322 into a multiplexer 324. Further, when multiplexer 324 is receiving a high select signal from Good0 multiplexer 234A, multiplexer 324 passes that error signal through to FIR 310 to set an error flag 326 associated with virtual core0. In addition, if Output Enable latch 272 is set high (indicating that virtual core1 is enabled) and Core1 160B generates an error signal while multiplexer 234A is passing a high signal (indicating that Core0 260A is good), the error signal from Core1 160B passes through latch 320B, an AND gate 330, and an AND gate 331 to FIR 310 to set an error flag 328 associated with virtual core1.

However, when Good0 multiplexer 234A is passing a low signal, multiplexer 324 passes error signals received from Core1 160B rather than Core0 160A. In addition, the low signal from Good0 multiplexer 234A blocks the path for signals from Core1 160B to error flag 328 at AND gate 331 while causing multiplexer 332 to pass the Core0 enable signal to AND gate 330. Consequently, when Core1 160B is operating as a virtual core0 the partial-good logic directs error signals from Core1 160B to error flags associated with virtual core0.

In addition, in the illustrative embodiment the partial-good logic includes similar circuitry for dynamically redirecting input and output on the other functional paths of central processing unit 110 that carry core-specific information, including paths for instruction fetch units (IFUs), configuration and status registers, scan ring definitions, external interrupts and other error indications and control signals, and every other component and operation required to enable Core1 160B to completely emulate Core0 160A. Consequently, components of data processing system 100 that are external to CPU 110 may be hardwired simply to address virtual coreD, and, even if Core0 160A is bad, the signals from those components can be processed effectively by Core1 160B in emulation of Core0 160A. Likewise, engineering code and testing code need not include complex conditional-processing logic to handle all of the possible good-core/bad-core combinations, but may be designed simply to address virtual core0 and to activate and deactivate processing cores as desired for particular tasks. Engineering configuration and test operation are, also simplified.

Furthermore, since the present invention allows cores to be activated and deactivated at run-time, service processor 130 may be programmed to automatically respond to a malfunction of an active core that occurs after the boot process is complete and normal operations have begun. For instance, service processor 130 could be programmed to respond to notification of a core malfunction by utilizing the partial-good logic described above to automatically deactivate the bad core. The program could also automatically activate a good core to replace the malfunctioning core if a good core is available and inactive, thereby avoiding system downtime or noticeably reduced system performance while waiting for repair. In addition, the present invention allows some cores to be easily kept inactive during normal system operation, and these inactive cores to be activated at run-time, thereby enabling vendors to minimize or eliminate the down time required to upgrade the processing power of computers that are in operation at customer sites.

As has been described, the present invention provides methods and systems for dynamically configuring multi-core processors. In particular, the present invention allows cores to be activated and deactivated dynamically (e.g., during production testing, at boot time, and at run time) and provides partial-good logic that can be configured to cause one core to emulate another. For example, an illustrative embodiment of the present invention features fuses that may be blown to inactivate defective cores and cause one core to emulate another core by default and latches that may be set to override the default configuration (for instance, to initialize a bad core, to deactivate a core in response to a malfunction of that core, and/or to activate a dormant core to replace a failing core or to augment processing power).

While the invention has been particularly shown and described with reference to an illustrative embodiment, it will be understood by those skilled in the art that various changes in form and detail may be made therein without departing from the spirit and scope of the invention. For example, although the boot program of the illustrative embodiment causes Core0 to serve as the virtual core0 in the absence of countervailing conditions, the boot program could just as well be designed to cause core1 to serve as virtual core0 by default.

Also, while aspects of the present invention have been described with respect to exemplary hardware, it should be understood that the present invention is not limited to the particular hardware architecture described. For example, although the present invention has been described with reference to data processing systems with one or more dual-core CPUs, the present invention could easily be extended to handle CPUs with three or more cores. In addition, while at least one core of each processor is active in the default configuration of the illustrative embodiment, a multi-processor system in accordance with the present invention could as well include one or more multi-core processors in which all cores are inactive by-default, the cores serving as sources of reserve processing power. Also, particular digital circuit elements (such as latches, AND gates, and multiplexers) are utilized in the illustrative embodiment to implement the features of the present invention an be called. It should be appreciated, however, that the functionality provided by those configuration elements could be implemented using alternative arrangements of logic gates, possibly in combination with software and/or firmware.

What is claimed is:

1. An apparatus for configuring processing core utilization in a data processing system that has at least one multi-core central processing unit (CPU) logically connected to a shared memory, said apparatus comprising:

input facilities that receive control input specifying which of at least first and second processing cores of a CPU is to be enabled, wherein said input facilities reside in an integrated circuit that also contains said CPU, including said at least first and second processing cores; and configuration logic in said integrated circuit that decodes said control input and selectively controls reception of input signals and transmission of output signals of one or more of said at least first and second processing cores in accordance with said control input, responsive to said decoding of said control input.

2. The apparatus according to claim 1, wherein:

said control input comprises selection input that specifies a configuration option among a first option in which said first processing core is to be enabled and said second processing core is not to be enabled, a second option in which said second processing core is to be enabled and said first processing core is not to be enabled, and a third option in which said first and second processing cores are both to be enabled; and said configuration logic configures said integrated circuit in accordance with said specified configuration option.

3. The apparatus according to claim 2, wherein:

said selection input indicates that said first and second processing cores are both to be enabled; and said configuration logic responds to said selection input by allowing said first and second processing cores to receive input signals and transmit output signals in accordance with said specified configuration option.

4. The apparatus according to claim 1, further comprising an error recovery facility that generates said control input in response to a determination that said first processing core has malfunctioned.

5. The apparatus according to claim 1, wherein:

said control input indicates that said second processing core is to be enabled in lieu of said first processing core; and said configuration logic responds to said control input by:
causing information addressed to said first processing core to be received and processed at said second processing core; and
causing output from said second processing core to be directed to an output path for said first processing core.

6. The apparatus according to claim 5, wherein:

said configuration logic comprises core labeling logic that causes said information to be processed at said second processing core by storing a processor identifier for said first processing core in one or more processor identifier fields within said second processing core.

7. The apparatus according to claim 6, wherein:
said information comprises a processing thread associated with said processor identifier; and
said second processing core processes said information by executing said processing thread.

8. The apparatus according to claim 5, wherein:
said configuration logic directs output from said second processing core to an output path for said first processing core by setting an output controller in said integrated circuit to allow output from said second processing core to pass through said output controller to enter a data storage facility of said data processing system.

9. The apparatus according to claim 5, wherein:
said control input specifies a first configuration;
said integrated circuit comprises a bad core indicator that produces said control input and an override element that produces an override indication specifying a second configuration that differs from said first configuration; and
said configuration logic implements said first configuration only if said input facilities are not receiving said override input.

10. A data processing system comprising:
at least one integrated circuit containing a central processing unit that includes at least first and second processing cores, wherein said first and second processing cores are logically connected to a shared memory;
input facilities in said integrated circuit that receive control input specifying which of said at least first and second processing cores is to be enabled; and
configuration logic in said integrated circuit that decodes said control input and selectively controls reception of input signals and transmission of output signals of one or more of said at least first and second processing cores in accordance with said control input, responsive to said decoding of said control input.

11. A data processing system according to claim 10, wherein:
said control input comprises selection input that specifies a configuration option among a first option in which said first processing core is to be enabled and said second processing core is not to be enabled, a second option in which said second processing core is to be enabled and said first processing core is not to be enabled, and a third option in which said first and second processing cores are both to be enabled; and
said configuration logic configures said integrated circuit in accordance with said specified configuration option.

12. A data processing system according to claim 11, wherein:
said selection input indicates that said first and second processing cores are both to be enabled; and
said configuration logic responds to said selection input by allowing said first and second processing cores to receive input signals and transmit output signals in accordance with said specified configuration option.

13. A data processing system according to claim 10, further comprising an error recovery facility that generates said control input in response to a determination that said first processing core has malfunctioned.

14. A data processing system according to claim 10, wherein:

said control input indicates that said second processing core is to be enabled in lieu of said first processing core; and
said configuration logic responds to said control input by:
causing information addressed to said first processing core to be received and processed at said second processing core; and
causing output from said second processing core to be directed to an output path for said first processing core.

15. A data processing system according to claim 14, wherein:
said configuration logic comprises core labeling logic that causes said information to be processed at said second processing core by storing a processor identifier for said first processing core in one or more processor identifier fields within said second processing core.

16. A data processing system according to claim 15, wherein:
said information comprises a processing thread associated with said processor identifier; and
said second processing core processes said information by executing said processing thread.

17. A data processing system according to claim 14, wherein:
said configuration logic directs output from said second processing core to an output path for said first processing core by setting an output controller to allow output from said second processing core to pass through said output controller to enter a data storage facility of said data processing system.

18. A data processing system according to claim 14, wherein:
said control input specifies a first configuration;
said integrated circuit comprises a bad core indicator that produces said control input and an override element that produces an override indication specifying a second configuration that differs from said first configuration; and
said configuration logic implements said first configuration only if said input facilities are not receiving said override input.

19. A method for dynamically altering processing core utilization in a data processing system having at least one central processing unit (CPU) residing in an integrated circuit, said CPU including at least first and second processing cores, wherein said first and second processing cores are logically connected to a shared memory, said method comprising:
receiving, at said integrated circuit, control input that specifies which of said at least first and second processing cores is to be enabled;
utilizing configuration logic that is hardwired into said integrated circuit to decode said control input, and to selectively control reception of input signals and transmission of output signals of one or more of said at least first and second processing cores in accordance with said control input, in response to said decoding of said control input.

20. A method according to claim 19, wherein:
said step of receiving said control input comprises receiving selection input that specifies a configuration option among a first option in which said first processing core is to be enabled and said second processing core is not to be enabled, a second option in which said second processing core is to be enabled and said first processing core is not to be enabled, and a third option in which said first and second processing cores are both to be enabled; and said step of utilizing said configuration logic comprises configuring said integrated circuit in accordance with said specified configuration option.

21. A method according to claim 20, wherein:

said selection input indicates that said first and second processing cores are both to be enabled; and said step of configuring said integrated circuit comprises allowing said first and second processing cores to receive input signals and transmit output signals in accordance with said specified configuration option.

22. A method according to claim 19, further comprising generating said control input in response to a determination that said first processing core has malfunctioned.

23. A method according to claim 19, wherein:

said step of receiving said control input comprises receiving configuration input indicating that said second processing core is to be enabled in lieu of said first processing core; and said step of utilizing said configuration logic comprises:
  causing information addressed to said first processing core to be received and processed at said second processing core; and
  causing output from said second processing core to be directed to an output path for said first processing core.

24. A method according to claim 23, wherein said step of causing said information addressed to said first processing core to be received and processed at said second processing core comprises:

storing a processor identifier for said first processing core in one or more processor identifier fields within said second processing core.

25. A method according to claim 24, wherein:

said information comprises a processing thread associated with said processor identifier; and said step of processing said information comprises executing said processing thread in said second processing core.

26. A method according to claim 23, wherein:

said step of directing output from said second processing core to an output path for said first processing core comprises setting an output controller in said integrated circuit to allow output from said second processing core to pass through said output controller to enter a data storage facility of said data processing system.

27. A method according to claim 23, wherein:

said control input specifies a first configuration;

said step of receiving said control input comprises receiving said control input from a bad core indicator within said integrated circuit;

said method further comprises determining whether an override input corresponding to a second configuration that differs from said first configuration is being received; and said step of causing information addressed to said first processing core to be received and processed at said second processing core is performed only if said override input is not being received.

* * * * *